(12) United States Patent
Di Teodoro

(10) Patent No.: US 11,683,098 B2
(45) Date of Patent: Jun. 20, 2023

(54) SPECTRALLY BEAM-COMBINED, FIBER-BASED MULTI-WAVELENGTH RECEIVER/TRANSCEIVER

(71) Applicant: Raytheon Company, Waltham, MA (US)

(72) Inventor: Fabio Di Teodoro, Hacienda Heights, CA (US)

(73) Assignee: Raytheon Company, Waltham, MA (US)

( * ) Notice: Subject to any disclaimer, the term of this patent is extended or adjusted under 35 U.S.C. 154(b) by 59 days.

(21) Appl. No.: 16/929,056

(22) Filed: Jul. 14, 2020

(65) Prior Publication Data

US 2022/0021460 A1 Jan. 20, 2022

(51) Int. Cl.
*H04B 10/50* (2013.01)
*H01S 3/067* (2006.01)
(Continued)

(52) U.S. Cl.
CPC ....... *H04B 10/5053* (2013.01); *G02B 6/2938* (2013.01); *H01S 3/0675* (2013.01); *H01S 3/06725* (2013.01); *H04B 10/5057* (2013.01); *H04B 10/564* (2013.01); *H04B 10/572* (2013.01)

(58) Field of Classification Search
CPC ............ H04B 10/5053; H04B 10/5057; H04B 10/564; H04B 10/572; H04B 10/5051; H04B 10/5161; H04B 10/502; H04B 10/505; H04B 10/524; H04B 10/50; G02B 6/2938; G02B 6/12007; G02B 17/0856; G02B 27/0944; G02B 27/4233; G02B 6/32; G02B 6/4204; H01S 3/06725; H01S 3/0675; H01S 3/0812; H01S 5/4012; H04J 14/005; H04J 14/02; H04J 3/1676;
(Continued)

(56) References Cited

U.S. PATENT DOCUMENTS 5,790,301 A * 8/1998 Maeda ............... G02B 6/29364
359/337
7,386,211 B1 6/2008 Di Teodoro et al.
(Continued)

OTHER PUBLICATIONS

Töws et al., "A Multi-Wavelength LIDAR System Based on an Erbium-Doped Fiber MOPA-System;" Proceedings of SPIE 9246, Lidar Technologies, Techniques, and Measurements for Atmospheric Remote Sensing X, 92460T; Oct. 20, 2014; 9 Pages.
(Continued)

*Primary Examiner* — Hibret A Woldekidan
(74) *Attorney, Agent, or Firm* — Daly Crowley Mofford & Durkee, LLP

(57) ABSTRACT

Methods and apparatus for providing spectrally beam-combined fiber-based transmitters and/or receivers for laser communications, LiDAR, and similar devices. A transmitter can include a launch array configured to spatially position each output beam of pulsed lasers, a transform optical component to correct deflection of the output beams of the pulsed lasers from the launch array, and a dispersive optical element to combine beams from the transform optical element and generate a spectrally combined beam. A receiver can include spectral comb filters to spectrally discriminate multi-wavelength detected signals from background illumination.

19 Claims, 14 Drawing Sheets

(51) Int. Cl.
H04B 10/572 (2013.01)
G02B 6/293 (2006.01)
H04B 10/564 (2013.01)

(58) Field of Classification Search
CPC .......... H04J 3/16; G01J 3/0208; G01J 3/0218; G02F 2201/02; G02C 7/107; G02C 7/102
USPC ....... 398/87, 88, 79, 68, 188, 118, 130, 135, 398/182
See application file for complete search history.

(56) References Cited

U.S. PATENT DOCUMENTS

| | | | | |
|---|---|---|---|---|
| 2003/0058504 A1* | 3/2003 | Cho | ....................... | H04B 10/60 398/147 |
| 2004/0114114 A1* | 6/2004 | Yano | ....................... | G02B 5/283 353/84 |
| 2006/0098194 A1* | 5/2006 | Tuschel | .................... | G01J 3/44 356/301 |
| 2007/0229939 A1* | 10/2007 | Brown | ................. | G02B 27/108 359/341.1 |
| 2012/0057235 A1* | 3/2012 | Chang | .................... | G02B 27/42 359/558 |
| 2013/0083292 A1* | 4/2013 | Silverstein | ........... | H04N 9/3117 353/7 |
| 2013/0336659 A1* | 12/2013 | Dutta | ..................... | H04B 10/11 370/345 |
| 2018/0009062 A1* | 1/2018 | Sbetti | ................... | B23K 26/382 |
| 2018/0306768 A1* | 10/2018 | Little | .................... | G16H 40/63 |

OTHER PUBLICATIONS

Huang et al., "WDM Free-Space Optical Communication System of High-Speed Hybrid Signals;" IEEE Photonics Journal, vol. 10, No. 6; Dec. 2018; 8 Pages.

* cited by examiner

SPECTRALLY BEAM-COMBINED, FIBER-BASED MULTI-WAVELENGTH RECEIVER/TRANSCEIVER

FIELD

This disclosure relates to transceivers. More specifically, this disclosure relates to LiDAR remote-sensing and lasercom transceivers.

BACKGROUND

The design of LiDAR, active (laser-based) remote-sensing, and laser-based free-space communication (hereafter "lasercom") transceivers demands the negotiation of many concurrent requirements pertaining to the laser transmitter, sensor/receiver, optical assemblies, driving electronics, and packaging. For example, long-range applications involving air- or space-borne platforms and targets located 10s or 100s km might rest on specialized high-power laser transmitters. The development of such transmitters may inflate costs and hinder the schedule and budget of programs mainly concerned with the rapid deployment of sensors in the field. Relying on proven commercial off-the-shelf (COTS) technology has historically reduced the risk of program delays and fund overruns; increased reliability; and contained the cost, size, weight, and power consumption of the transceiver in production.

Diode-pumped solid-state lasers have established themselves as a standard transmitter technology for fielded LiDAR, remote sensing, and lasercom applications owing to their reliance on electrical power, as well as general support for compact packaging and rugged build. Among solid-state lasers, fiber lasers are especially attractive for deployment in harsh environments in that they can be constructed as all-fusion-spliced chains of components resembling electronic chips, without free-space bulk optics subject to misalignment. Moreover, fiber can be tightly coiled to fit in small spaces or stretched and bent to occupy odd-shaped enclosures. In addition, fiber lasers are electro-optically efficient, thermally manageable, and naturally prone to emitting a beam of good spatial quality via controlled optical wave-guidance, properties that contribute to make them suitable for the most demanding sensing and lasercom applications including those requiring high laser-pulse repetition rates (up to multi-MHz or even GHz) and high average laser power.

However, pulsed fiber lasers (PFLs) normally used in such applications exhibit well-known pulse energy and peak power limitations because of the inherently thin and long nature of the fiber medium, which results in high gain for parasitic nonlinear effects and relatively low pulse energy storage.

Spectral beam combining (SBC) is a well-documented approach to increasing laser power. It includes arraying a plurality of lasers, each performing within their limits, and combining their output into a single beam carrying the sum of all arrayed laser power, but exhibiting the same beam quality of a single laser. The combining element often is a dispersive optical component (DOE), such as a diffractive grating, and the beam combining effect rests on the fact the each laser operates at a distinct wavelength such that the DOE can spatially overlap their emitted beams.

While SBC has in recent years been demonstrated as a practical technology for directed energy applications, which typically rely on continuous-wave (CW) fiber lasers, this approach is far less common with PFLs used as transmitters for LiDAR, sensing, and lasercom applications. The related prior art is largely limited to the notion that SBC can, in fact, be implemented with PFLs, provided that the PFL are time-synchronized, i.e., emit temporally overlapped pulses, while each PFL operates at a distinct wavelength as typical of SBC. High-power PFLs emitting nanosecond pulses and leveraging specialty large-core fibers have been disclosed as being part of SBC architectures for increasing pulse energy and peak power.

The prior art does not address the architecture of an optical receiver that could adequately process the multi-wavelength return beam that such systems would produce. In particular, the prior art does not address the spectral discrimination of multi-wavelength return signals from broadband background light (solar radiation, in many cases), which is critical to attaining sufficient signal-to-noise ratio (SNR) and, thus, ensuring proper operation of LiDAR, remote sensors, and lasercom terminals.

SUMMARY

Example embodiments of the disclosure provide methods and apparatus for LiDAR remote-sensing and lasercom transceivers that leverage the higher power and/or greater spectral bandwidth afforded by SBC of PFLs without degrading the transceiver operating SNR or field of view. In some embodiments, such architectures permit to effectively increase the laser transmitter power and, thus, operation range, without having to resort to unique laser technology that must be custom-developed (at high cost and risk) for each application. In some embodiments, COTS PFLs directly emitting at eye-safe wavelengths can be combined to yield a high-power laser transmitter output. This embodiment may greatly simplify the architecture of traditional long-range eye-safe-wavelength transmitters, which often rely on nonlinear wavelength conversion of 1 µm-wavelength lasers. In other embodiments, a system leverages the multi-wavelength nature of the laser transmitter to increase the bandwidth of free-space lasercom channels via wavelength-division multiplexing.

For such embodiments, and in contrast to conventional LiDAR systems, example embodiments provide a way to spectrally discriminate multi-wavelength detected signals from background illumination, and particularly solar light, through spectral-comb filters insensitive to the light angle of incidence. In some embodiments, such filters are part of a fiber-coupled receiver apparatus, which is capable of multi-pixel three-dimensional imaging and may include a two-dimensional photon counting sensor array device of larger sensing area compared to state-of-the-art cameras. In some embodiments, the sensor includes a focal-plane array formed by the end facets of receiving optical fibers, which can naturally be laid out on a curved surface of arbitrary shape to improve the system optical imaging capabilities.

In one aspect, a transmitter comprises: a plurality of pulsed lasers having respective output beam; a launch array configured to spatially position each output beam of the pulsed lasers; a transform optical component to direct the output beams of the pulsed lasers from the launch array onto the dispersive element at proper angles; and a dispersive optical element to combine beams from the transform optical element and generate a spectrally combined beam.

In another aspect, a receiver to detect light from a spectrally combined beam (SBC) transmitter, comprises: an optical element to focus the detected light; a spectral comb filter to filter the focused light from the optical element, wherein the spectral comb filter includes a plurality of windows each having a respective pass band; and a photon detector to process received data from the optical element and discriminate the light from the SBC transmitter from spectrally broadband illumination.

BRIEF DESCRIPTION OF THE DRAWINGS

The foregoing features of this disclosure itself, may be more fully understood from the following description of the drawings in which.

DETAILED DESCRIPTION

Figure 1:
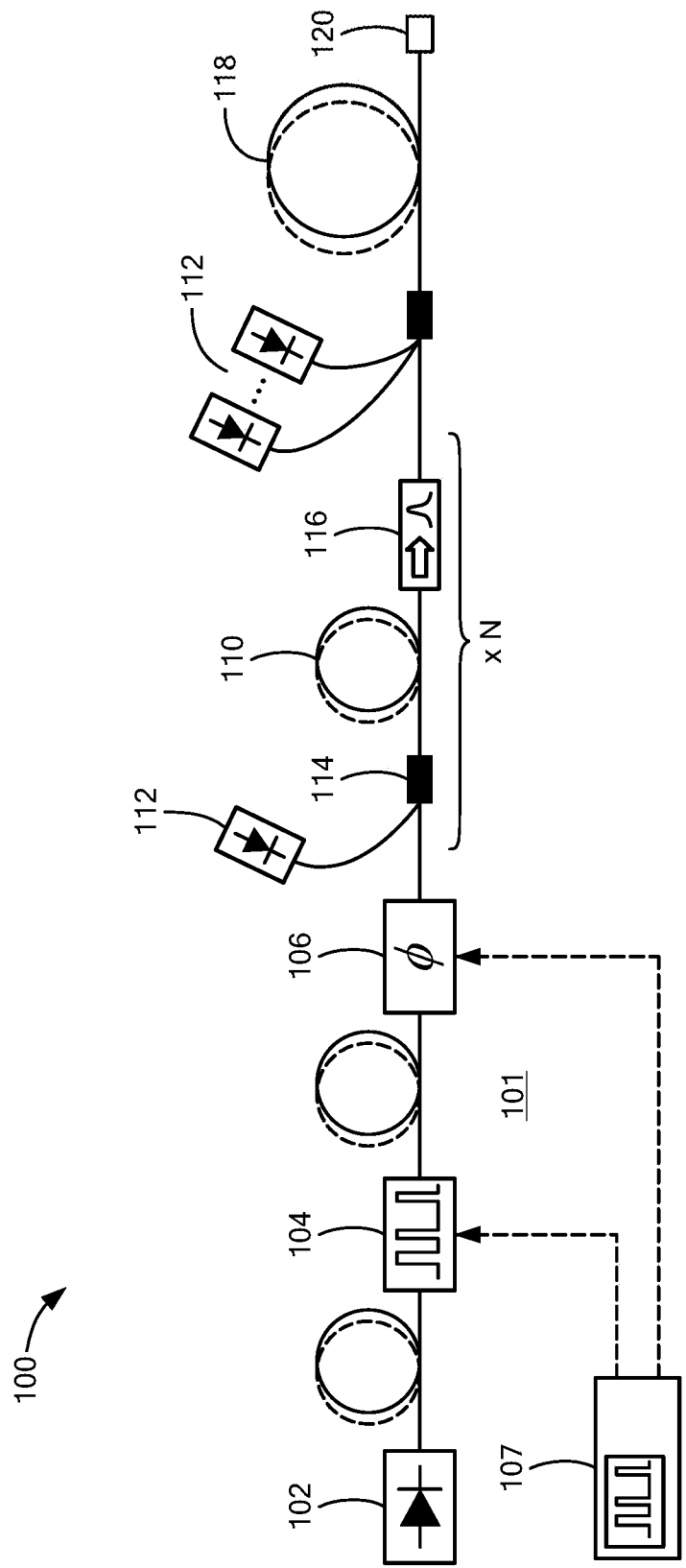
FIG. 1 is a schematic representation of a LiDAR system having spectrally combined beams.

FIG. 1 shows an example architecture of a PFL-based LiDAR system 100 for remote sensing, lasercom applications, etc. The PFL-based system 100 comprises a signal seeder 101 including a master oscillator (MO) 102 followed by an external amplitude modulator 104 and a phase modulator 106, both of which are coupled to a pulse driver 107. In embodiments, the MO 102 comprises a single-frequency laser source, i.e., a source emitting light spectrally confined within a single longitudinal mode of oscillation of a laser cavity. In some embodiments, the MO 102 comprises a fiber-coupled distributed-feedback or distributed Bragg reflector semiconductor laser operating at a select eye-safe wavelength, i.e. a wavelength greater than ~1.4 µm, comprised within spectral windows of good atmospheric transmission such as ~1.5-1.6 µm or ~1.9-2.0 µm. In other embodiments, the MO can comprise a fiber-coupled semiconductor laser, which emits a single-frequency output owing to the spectrally selective optical feedback from an external cavity comprising a dispersive element such as a volume Bragg grating.

In some embodiments, the light amplitude modulator 104 in the signal seeder 101 of the PFL system comprises a Mach-Zehnder interferometer embedded in an electro-optically active crystal, such as a fiber-coupled lithium-niobate modulator. Alternatively, the amplitude modulator 104 can comprise one or more fiber-coupled electro-absorptive devices featuring a semiconductor chip exhibiting optical absorption voltage-controlled via the Franz-Keldysh effect. In other embodiments, the amplitude modulator 104 comprises one or more current-controlled fiber-coupled semiconductor optical amplifiers operated as time-gating devices. In yet other embodiments, different amplitude modulators including those listed here as well as other types can be combined in order to meet specific pulse format requirements involving pulse repetition frequency (PRF), pulse width, pulse temporal profile/shape, and on/off extinction. In some embodiments, the amplitude modulator 104 or set of modulators can generate sequences of optical pulses of nanosecond duration or as short as 10s of picosecond at PRF values of few kHz to 10s of GHz or higher. In embodiments, the generated optical pulse sequences are controlled by driving the modulators with arbitrary waveform generator, which may include a digital synthesizer, broadband digital-to-analog converter, radiofrequency amplifier, and in some cases a voltage-controlled pulsed current source. In lasercom applications the pulse driver includes a broadband modem for encoding data-streams into suitable amplitude or phase patterns.

In some embodiments, the signal seeder 101 also includes the optical phase modulator 106, which can for example be used to deliberately broaden and shape the signal spectrum so as to inhibit the onset of unwanted nonlinear optical effects such as stimulated Brillouin scattering and/or four-wave mixing. In other embodiments, the phase modulator 106 can be driven by the modem to impart on the seed-generated beam optical phase patterns that may encode data streams, as further discussed below.

The signal seeder 101 is followed by one or more rare-earth doped fiber pre-amplifiers 110. In typical embodiments, ytterbium (Yb)-, erbium (Er)-, or thulium (Tm)-doped fibers are used to amplify seed signals at ~1.0-1.1, 1.5-1.6, 1.9-2.0 µm wavelength, respectively. The pre-amplifiers include a fiber-coupled component purposed to inject pump light from a fiber-coupled diode laser 112. In some embodiments, the coupler 114 is a tapered fiber bundle designed for cladding pumping of the rare-earth-doped pre-amplifier fiber and comprising one or more multi-transverse-mode fibers side-fused to a central single-transverse-mode fiber, which guide pump light from a multi-transverse-mode diode laser and signal light, respectively. The tapered fiber bundle is fusion-spliced at the input (forward pumping) and/or output (backward pumping) end of the rare-earth-doped pre-amplifier fiber. In some embodiments, the pumping diode laser 112 is a multi-transverse-mode diode laser operating at ~915-920, ~940, or ~975-980 nm (for Yb- and Er-doped fiber pre-amplifiers) or ~780-790 nm (Tm-doped fiber pre-amplifiers). In other embodiments, the coupler 114 is a single-transverse-mode signal/pump multiplexer designed for core pumping of the rare-earth-doped pre-amplifier fiber and intended for use with single-transverse-mode fiber-coupled pump diode lasers operating at the wavelengths specified above.

Fiber-coupled components including optical bandpass filters 116 centered at the signal wavelength and Faraday optical isolators can be installed after each fiber amplifier 110 in order to prevent build-up of spectrally broadband amplified spontaneous emission (ASE) throughout the amplifier chain and prevent disruption caused by backward propagating light (including backward-propagating ASE, back-reflections, Rayleigh scattering, stimulated Brillouin scattering, and residual unabsorbed pump light). In an example embodiment, the filter 116 comprises a fiber-coupled amplified-spontaneous-emission filter and Faraday isolator.

The PFL can comprise a rare-earth-doped fiber amplifier 118 that can be referred to as "power amplifier". In some embodiments, the power amplifier 118 includes a rare-earth-doped fiber of larger core-area compared to pre-amplifiers in order to support the generation of pulses of greater energy and peak power without incurring unwanted, parasitic non-linear optical effects. In embodiments, the power-amplifier fiber 118 is also designed to emit a Gaussian-like output beam of a predominantly fundamental-transverse-mode nature, hence characterized by good spatial beam quality (BQ) as well as stable far-field pointing. Fiber designs supporting fundamental-transverse-mode, good-BQ operation in relatively large cores include large-mode area fibers (implementing, for example, bend-loss mode filtering), photonic crystal fibers, linearly tapered fibers, and various types of self-spatial-filtering fibers such as chirally-coupled-core fibers.

In embodiments, the power-amplifier fiber is terminated by an output beam-expanding endcap 120, such as a glass cylinder of few-millimeter length fusion-spliced to the fiber end, intended to permit unguided expansion of the beam propagating in the fiber core prior to exiting the fiber into free space, so as to reduce its irradiance to safe values at fiber exit facet. The endcap 120 can be angle-polished and/or anti-reflection coated to prevent Fresnel reflections off the glass/air interface from propagating back into the fiber core. In some embodiments, the power-amplifier fiber might be fusion-spliced to a non-rare-earth-doped delivery fiber, for example to ease packaging, in which case the endcap is applied to the exit facet of such delivery fiber.

In example SBC embodiments, the output beam from each PFL is collimated by an external lens, either standalone or part of a lenslet array. In some embodiments, the lens is integral to the endcap 120 and obtained by shaping the endcap facet into a curved surface via heat-processing with the electric arc of a fusion splicer or other heat source.

Figure 2:
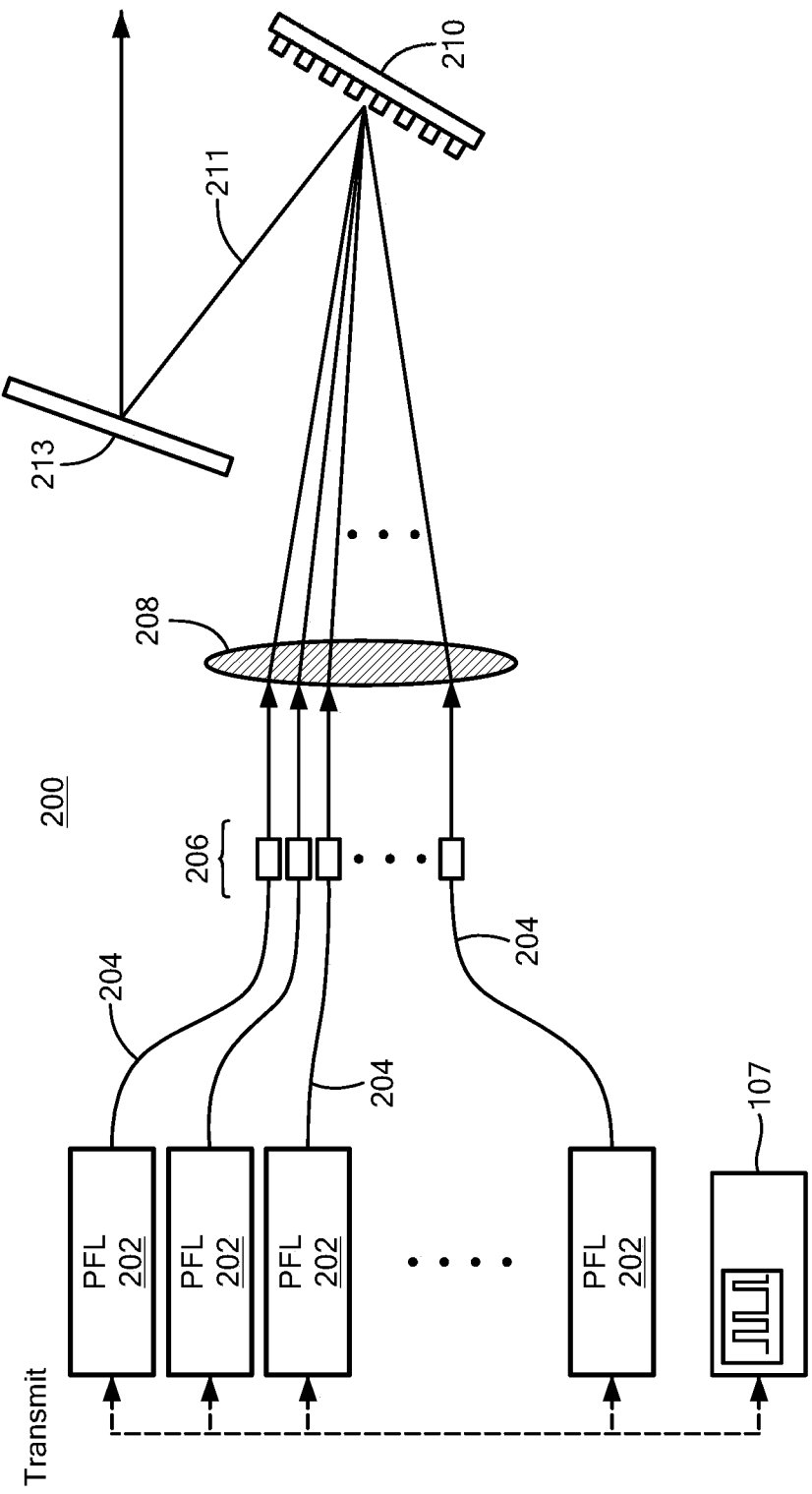
FIG. 2 is a schematic representation of an example transmitter for a LiDAR system having spectrally combined beams.

FIG. 2 provides a schematic view of an example laser transmitter 200 for LiDAR, remote sensing and lasercom based on SBC of PFLs. In typical embodiments, the end facets of the power-amplifier 202 fibers 204 (or delivery fibers, if used) are installed adjacent to each other and secured to a mechanical structure, which can be referred to as launch array 206 designed to ensure common far-field pointing and mutual parallelism of all exit laser beams. In some embodiments, the launch array 206 is linear and the fiber ends are thus lined up on a common plane, at a specific mutual distance from each other. In alternative embodiments, the fiber ends can be laid out to form a two-dimensional array, for example a closely packed hexagonal array, which might help reduce the dimensions of downstream optical components and thus facilitate the transceiver packaging and reduce cost, but does not significantly alter the transceiver operation principles compared to a linear launch array.

The parallel and collimated beams exiting the launch array are processed by means of free-space optical components, such as a transform optical element 208 and combining element 210, performing the spectral combining function. The combining element 210 generates a combined beam 211 to reflection by a steering/directing mirror set 213.

In an embodiment, the combining element 210 comprises a dispersive optical component, such as a binary multi-layer dielectric (MLD) diffraction grating. This type of grating is usually designed to yield single-diffraction-order operation in a near-Littrow configuration such that all beams incident at angles specifically related to their wavelengths are overlapped into a single reflected beam, with negligible power lost into other diffractive orders, as inferred from the grating equation:

$$\theta_j = \arcsin(\sin\theta_L - mN\lambda_j). \quad (1)$$

Here, $\theta_j$ is the angle of incidence (with respect to the normal, $\hat{n}$ to the grating surface) of the j-th incident beam, $\theta_L$ the Littrow angle, m the diffraction order, N the grating number of lines per unit length, and $\lambda_j$ the wavelength of the beam incident at $\theta_j$ angle. The single-diffraction-order condition, which is essential to SBC, can thus be expressed as a pair of conditions to be met for all values of j:

$$\frac{1}{\lambda_j} < N < \frac{2}{\lambda_j}, \quad (2)$$

$$\theta_j > 0. \quad (3)$$

If Eqs. (2) and (3) hold, then Eq. (1) only admits solutions if m=−1, where the negative sign signifies that the diffracted beam lies on the same side as the incident beams with respect to $\hat{n}$. As shown in FIG. 2, the "transform" optical component 208 (e.g., lens or curved mirror) imparts to each of the parallel laser beams exiting the launch array the correct deflection in the grating dispersive plane, thus satisfying Eq. (1) for all combined wavelengths.

In other SBC embodiments, the combining element 210 can comprise a single-diffractive-order transmissive grating, such as a volume Bragg grating, or a set of dichroic edge filters.

Figure 3A:
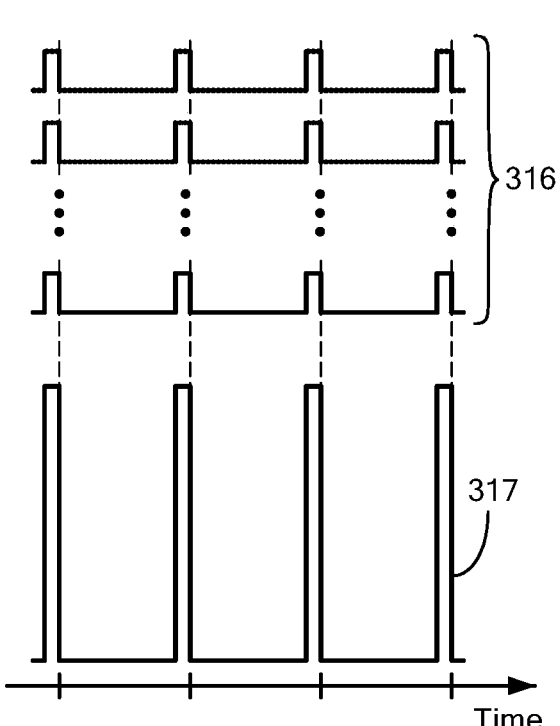
FIGS. 3a-3c show example spectrally combined waveforms to achieve cumulative addition of pulse energy.
Figure 3B:
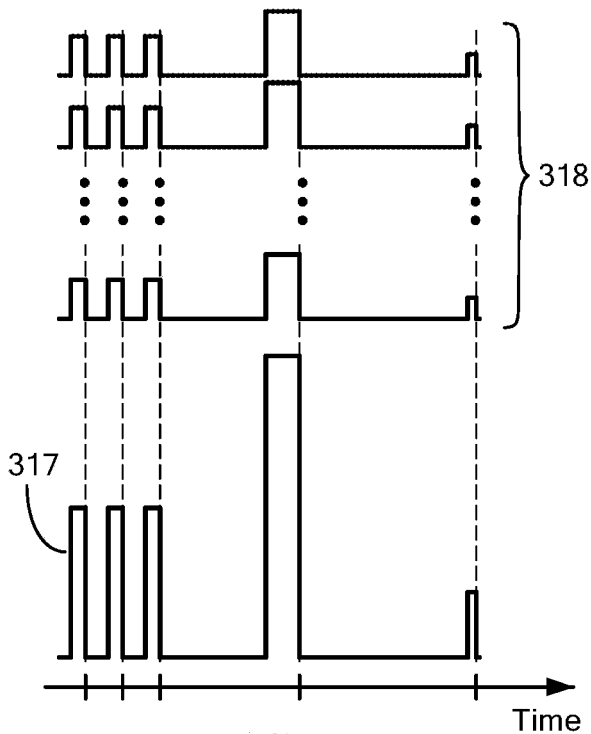
Figure 3C:
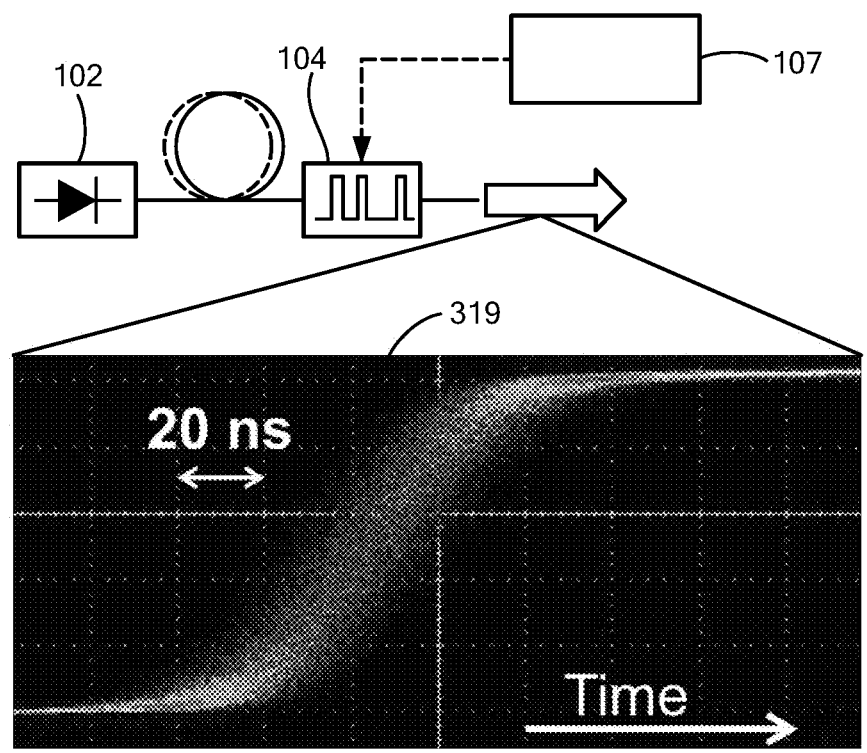

In example LiDAR applications, the optical pulses emitted by the spectrally combined PFLs are time-synchronized to achieve cumulative addition of pulse energy in the combined beam, as illustrated in FIGS. 3a-3c. Example of pulsed modes of operation for spectrally combined pulsed fiber lasers (PFLs) generating pulses. The PFLs emit identical, time-synchronized pulse sequences 316 of constant pulse duration and repetition frequency. The combined pulse sequence 317 has the same temporal characteristics of that emitted by each PFL, but the pulse energies and powers are the sum of those emitted by each PFL. The PFL emit identical, time-synchronized pulse sequences of variable pulse duration and repetition frequency 318, as shown in FIGS. 3a-3c. Typical time jitter 319 exhibited by COTS amplitude and phase modulators is also shown in FIGS. 3a-3c.

The PFL architecture described in FIG. 1 naturally supports this additive mode of operation because COTS amplitude modulators exhibit diminutive time jitter with respect to an electronic trigger signal. For example, if we model the time jitter as a normally distributed random variable having zero mean value and variance δτ~25 ps (see FIG. 3c) we can then derive a SBC relative pulse-power "defect", ΔP/P, as $$\frac{\Delta P}{P} \sim \frac{2}{\sqrt{N}} \frac{\delta\tau}{\tau}, \quad (4)$$

where ΔP is the pulse-power loss caused by imperfect time overlap, N is the number of combined PFLs, τ is the pulse duration and P is the maximum SBC-achievable pulse power given by $$P = \eta N P_{peak}^{PFL}. \quad (5)$$

Here, η is the SBC efficiency (typically, >95% when MLD gratings are used) and $P_{peak}^{PFL}$ the peak power of each combined PFL. In the case of few-ns pulses, ΔP/P<0.025.

Figure 4:
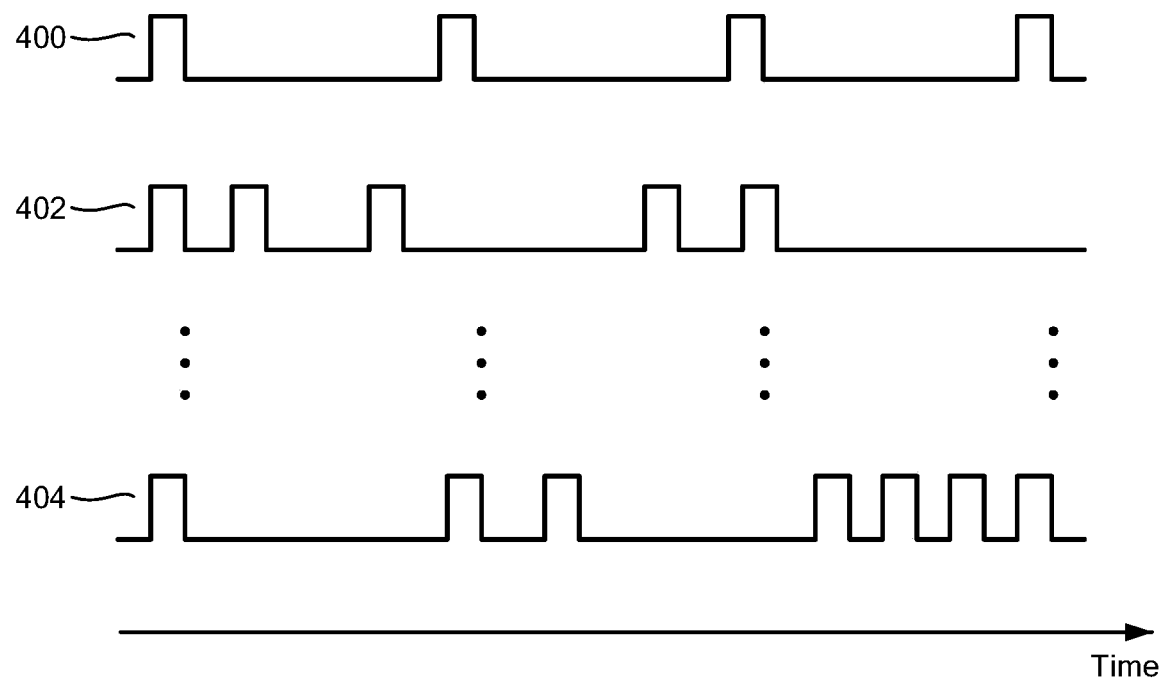
FIG. 4 shows example waveforms for PFLs emitting distinct pulse sequences.

In lasercom applications, the pulses can be time-synchronized (for the same purpose of attaining greater pulse power in the combined beam) or each PFL can emit a distinct pulse sequence 400, 402, 404, as shown in FIG. 4. This mode of operation corresponds to wavelength-division multiplexing: the PFL beams are spatially overlapped and propagate as a single beam after SBC, but each wavelength carries a different data stream 400, 402, 404. In typical embodiments, each PFL encodes data using a standard, optical-telecom amplitude-modulation pattern such as on-off keying or pulse-position modulation. In some embodiments, the fiber laser sources being combined are not operated in pulsed mode, but rather phase-modulated to encode data using patterns such as binary or quadrature phase shift keying and variants of these patterns. The architecture in FIG. 1 supports both amplitude and phase modulation, as well as hybrid combinations of these data encoding patterns.

Free-space optics can be used to process the combined beam prior to exiting the transceiver. In some embodiments, the combined beam is relayed to a beam director, having been expanded and collimated. In some embodiments the beam director might be installed within or combined with an opto-mechanical structure used to steer the beam by setting its azimuth and elevation, such as a gimballed mirror within a rotating turret. In other embodiments, the exit beam can be steered by other types of moving optical components such as rotating mirrors, galvo-mirrors, micro-electromechanical mirrors, Risley prisms, or by non-mechanical beam steering devices such as liquid-crystal optical phase arrays.

Figure 5:
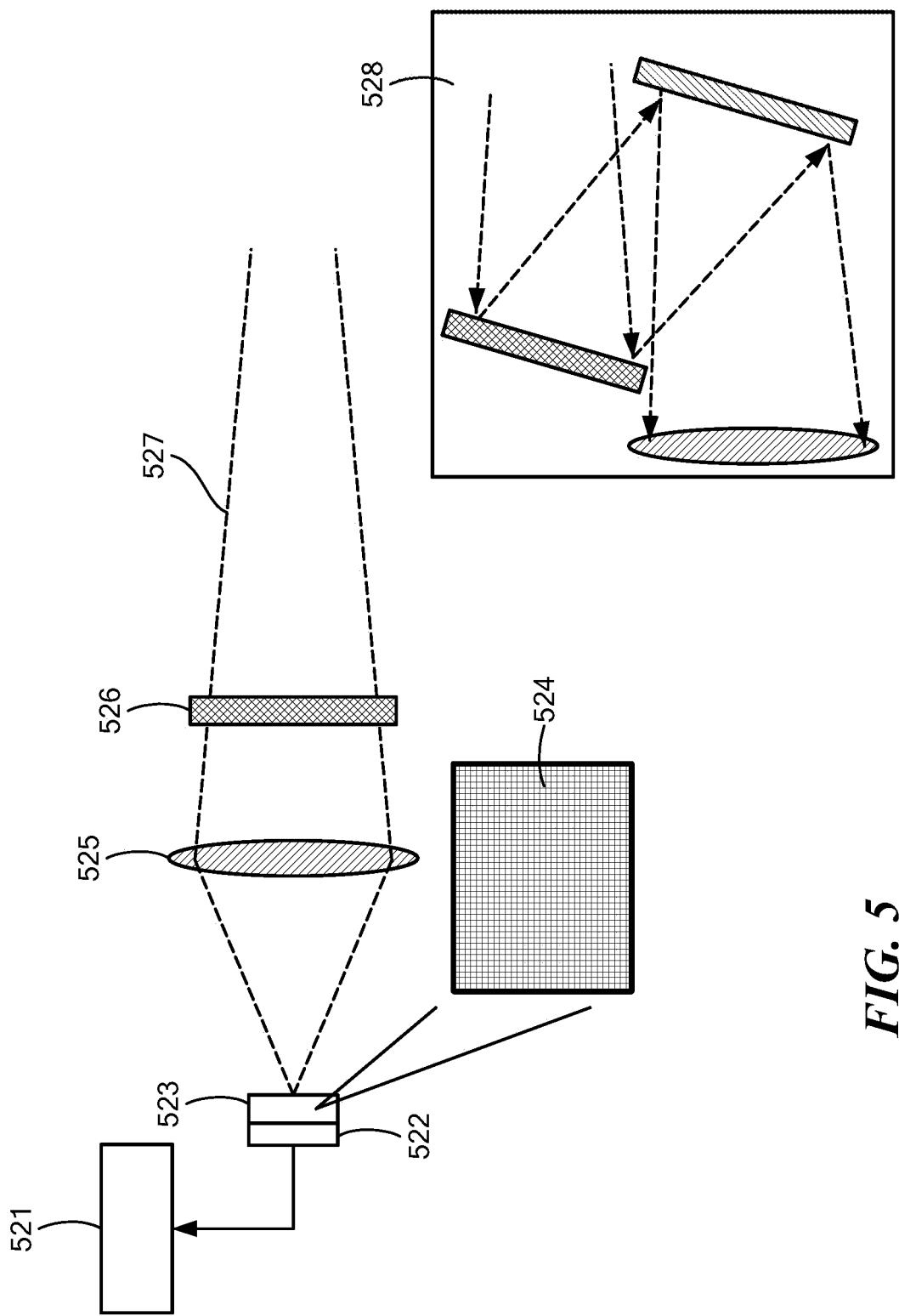
FIG. 5 is a schematic representation of an example receiver for a LiDAR system having spectrally combined beams.

FIG. 5 illustrates the layout of an example receiver 500 for a LiDAR/remote-sensing system or lasercom terminal. The received beam is either a reflection of the transmit beam off a distant target or, in the case of lasercom applications, the signal emitted from a distant transmit station. In monostatic configurations, the received and transmitted beam share optical paths and can then be discriminated by a variety of methods including central obscuration/beam-stops, center-drilled mirrors, beam-splitting polarizers, motorized optical assemblies, and acousto-optic beam deflectors. In bi-static configurations, transmitted and received beams do not share optical paths and are thus separated by geometry. In many embodiments, the received beam is processed by a free-space optical component train, which performs at least two tasks: focus the received beam onto a high-sensitivity and high-speed photon detector and discriminate the received signal from spectrally broadband illumination background often consisting of scattered sun light.

In some embodiments, a single photo detector is used to convert the received, focused beam into a measurable electric photo-current. In the illustrated embodiment, FIG. 5 a free-space receiver for a LiDAR, remote sensor, or lasercom transceiver including data decoding/processing electronics 521, sensor readout circuitry 522, and a sensor or sensor array 523. In embodiments, a focal-plane array 524 can be used along with a focusing (imaging) lens or lens system 525 and band-pass filter 526 for received optical beam 527 from LiDAR target or remote lasercom station. An alternate received-beam path 528 can implement a reflective, rather than transmissive band-pass filter.

In many cases of interest, semiconductor photodetectors might, instead, be used including silicon (Si) or indium-gallium-arsenide (InGaAs) or mercury-cadmium telluride (HgCdTe) PIN photodiodes or avalanche photodiodes (APD), which are especially suited, in terms of spectral sensitivity, to near-infrared laser transmitter wavelengths ~1 μm, ~1.5 μm, and ~2 μm, respectively. In some embodiments, the detectors are designed to efficiently detect very low levels of optical signal and, in some cases, operate as single-photon counters. For example, APDs reverse-biased above the breakdown voltage yield very high photoelectric gain and very quickly produce large photo-currents even upon the absorption of a single photon and are, therefore, referred to as single-photon avalanche diodes (SPADs) or, in some cases, Geiger-mode APDs. In some embodiments, an array of photodetectors (focal-plane array, FPA) rather than a single detector is implemented and installed at the received-beam focal plane. Examples of FPAs described in the prior art include SPAD cameras, which can be used, for example, to detect the return signal in three-dimensional (3D) imaging flash LiDAR applications. In some configurations referred to as "silicon photomultipliers" (SiPM), the FPA SPADs can all be parallel-connected, in which case the FPA operates similarly to a single detector and, thus, loses its spatial imaging capabilities, but can now record return-light intensity values (number of photons) similar to an analog/linear detector, while still exhibiting single-photon sensitivity.

Figure 6:
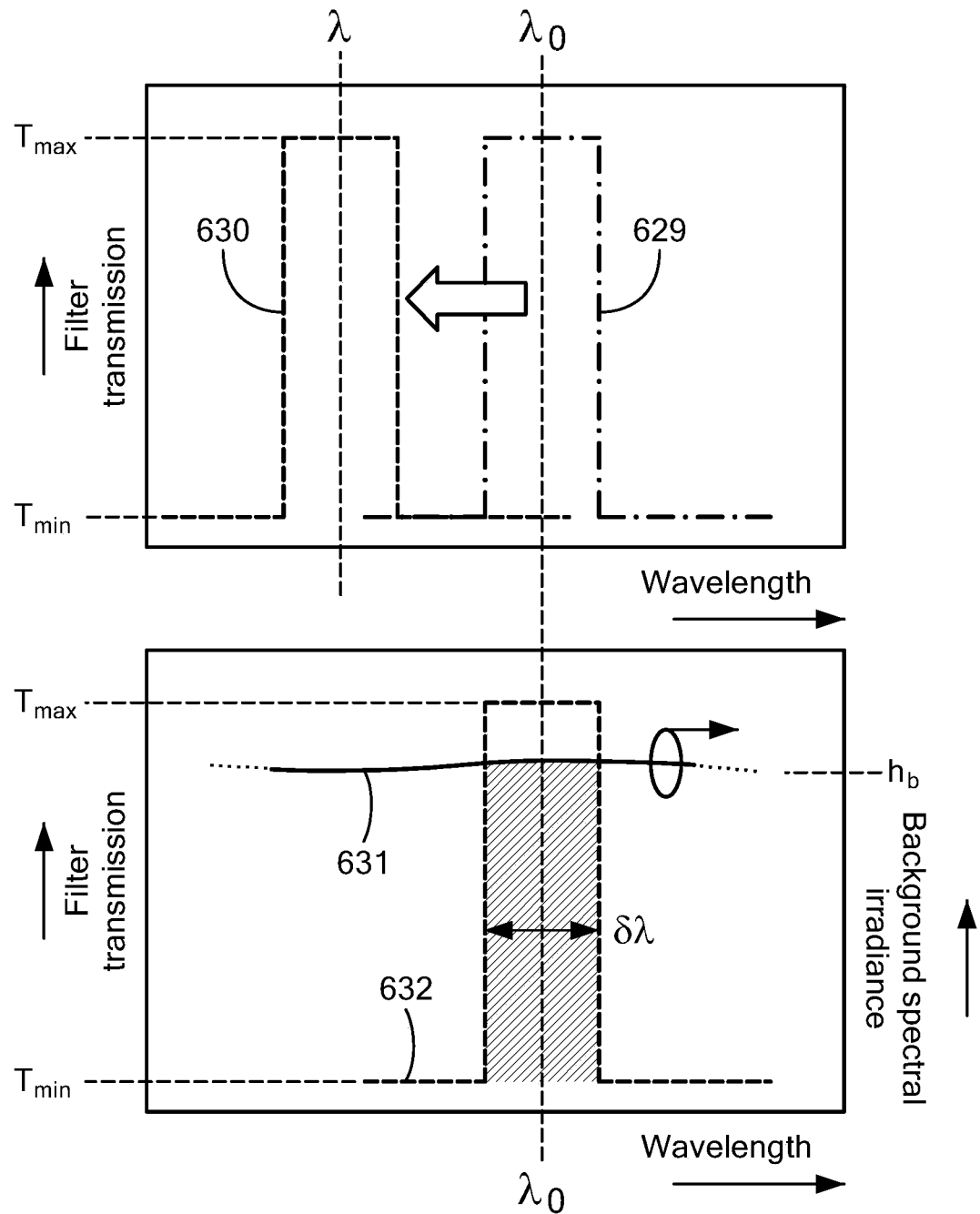
FIG. 6 shows example waveform filtering.

In embodiments, the signal/background spectral discrimination in the receiver is accomplished by means of a transmissive optical bandpass filter, namely an optical component exhibiting high transmission (for example, >90% in power) for light having wavelength within a relatively narrow window (for example, 1-2 nm wide) referred to as "pass band", centered at the laser transmitter wavelength, as illustrated in FIG. 6.

A normal-incidence (AOI=0°) transmission profile 629 of a band-pass filter has full-width at half maximum (FWHM) δλ and centered at $\lambda_0$. A power-transmission profile 630 of the same filter for non-normal-incident light (AOI≠0°), is centered at the blue-shifted wavelength λ. Spectral irradiance of background illumination 631 may be nearly flat over the width of the filter). The grayed-out area shows the portion of background illumination which falls within the filter spectral width and can thus reach the sensors. Power transmissivity 632 is in the blocking region of the filter. In typical embodiments, $T_{max}/T_{min}$>50 dB.

The filter exhibits instead high rejection (for example, through optical reflection) for light having wavelength outside the pass band. In other embodiments, the spectrally discriminating filter optical properties might be reversed (i.e. high reflection in a narrow spectral window and high transmission elsewhere), in which case the filter might be referred to as "notch" filter, although its operation principles remain fundamentally the same as those for transmissive filters.

Figure 7:
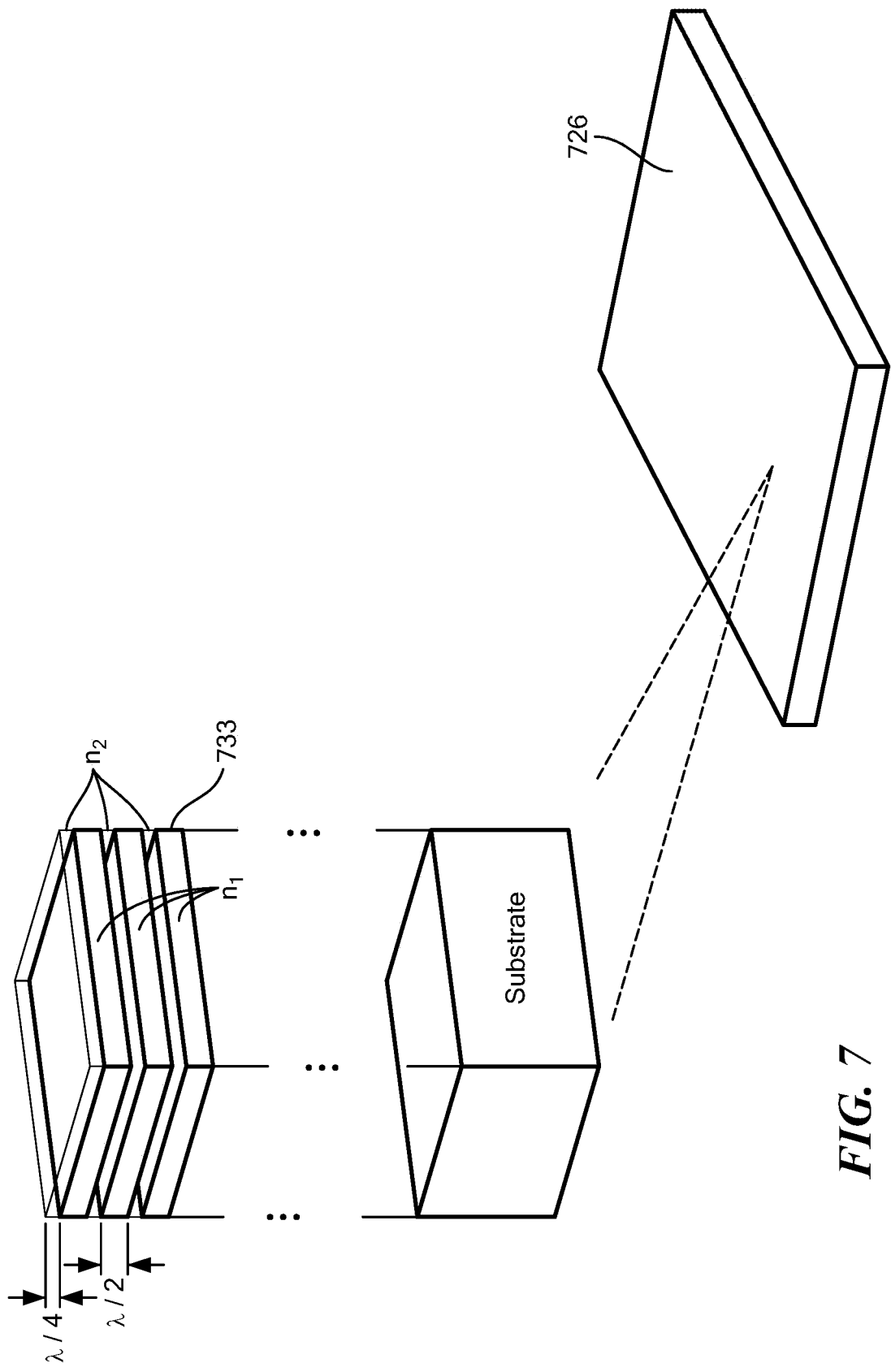
FIG. 7 is a schematic representation of an example transmissive bandpass filter.

FIG. 7 illustrates the design and operation principle for example transmissive bandpass filters that can be used in example embodiments of the disclosure. A multi-layer dielectric (MLD) coating 733 is deposited on the surface of an optical band-pass filter. The coating features thin films of alternating thickness and refractive-index values, which results in spectrally discriminating operation via optical interference. The filter includes an optically transmissive substrate (for example fused silica or other highly transmissive dielectric or semiconductor material appropriate for the laser transmitter wavelength) surface-coated with a multi-layer dielectric (MLD) stack of thin-film materials. In simple embodiments of this design, the MLD coating comprises alternating layers of high- and low-refractive-index dielectrics of different thickness. For example, the alternating dielectric layer materials can be fused silica and an optical-quality transition-metal oxide such as tantala (tantalum pentoxide, $Ta_2O_5$), hafnia (hafnium dioxide, $HfO_2$), niobia (niobium pentoxide, $Nb_2O_5$), or titania (titanium dioxide, $TiO_2$). In one design, which can be referred to as "quarter-wavelength stack", layer thicknesses equal to $\lambda/2$ and $\lambda/4$, where $\lambda$ is the reference operation wavelength, alternate. Owing to the geometry of such MLD coating, the layers form nested Fabry-Perot étalon cavities, which exhibit constructive interference, hence high optical transmission, at wavelength $\lambda$ and high reflection at other wavelengths. In many embodiments, the number of nested cavities, which is related to the number of layers stacked in the MLD coating, affects the steepness of the optical transmission decay outside the filter pass band, i.e. the sharpness of the spectral transmission/rejection edge with MLD coatings featuring a large number of layers giving rise to sharper filters. In some embodiments, for example, properly designed filters having ~1 nm pass bandwidth can exhibit optical-power rejection >60 dB at wavelengths ~10 nm away from the pass-band center. Other MLD designs can also be realized, although the optical-interference-based principle of operation remains in essence the same.

Figure 8A:
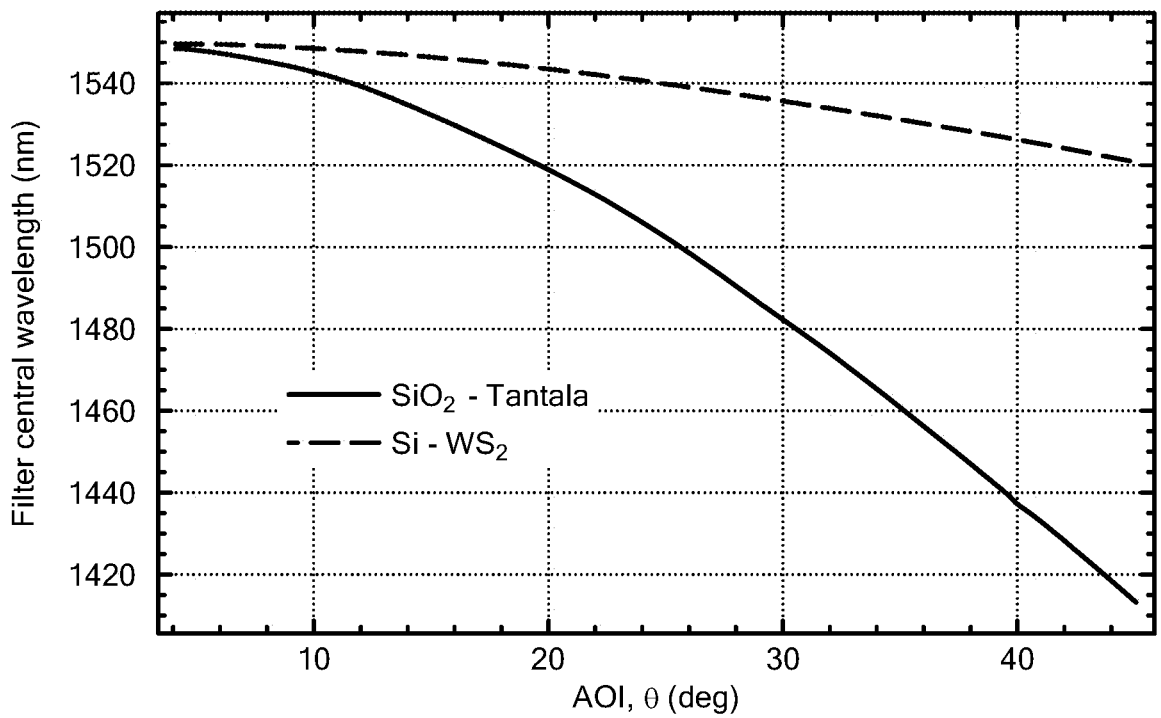
FIG. 8a is a graphical representation of angle of incidence versus central transmit wavelength and FIG. 8b is a graphical representation of filter pass band versus filter FOV.

FIG. 8a shows a central-wavelength of a MLD-coated optical band-pass filter vs. light angle of incidence (AOI). The black trace refers to a MLD stack featuring layers of fused silica ($SiO_2$) and tantala ($Ta_2O_5$). The thick gray trace refers to a MLD stack of amorphous silicon and tungsten disulfide ($WS_2$), which results in higher effective refractive index and thus lower sensitivity to AOI; (b) Corresponding band-pass filter field of view (FoV) vs. filter full-width at half maximum (FWHM) for the same type of coatings mentioned above.

Figure 8B:
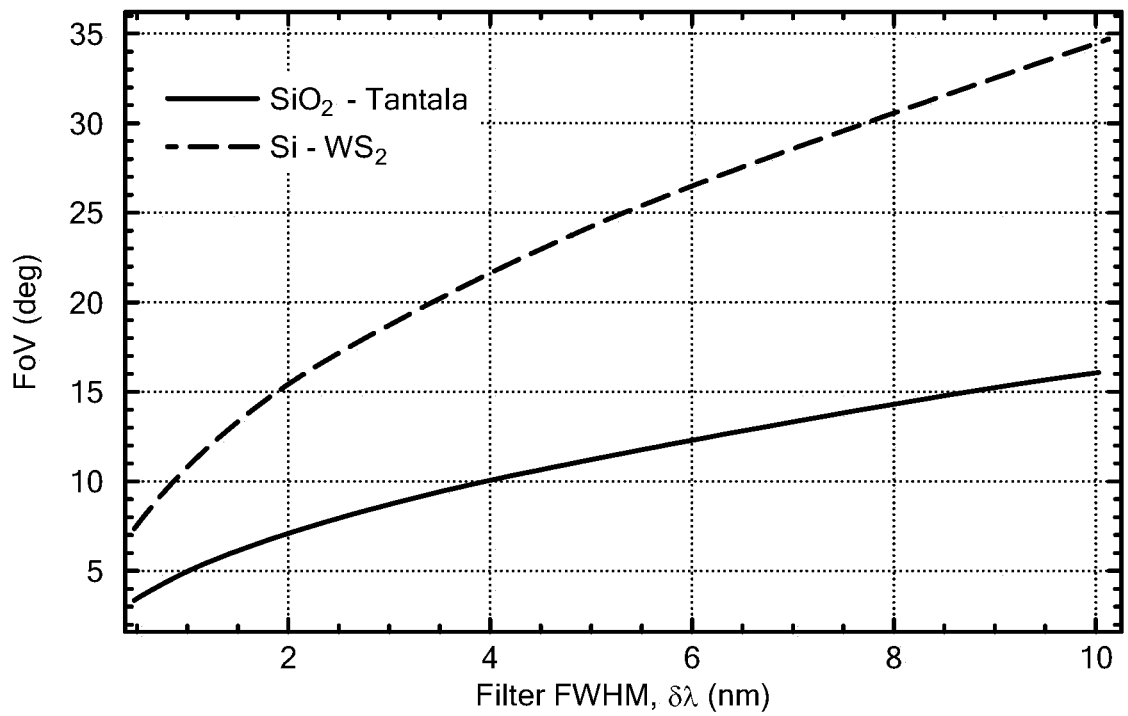

A direct consequence of the nature and operation principles of MLD filters is that they inherently exhibit a dispersive behavior. Referring again to FIG. 6, the transmitted operation wavelength in such filters blue-shifts as the angle of incidence (AOI) of light impinging upon the filter departs from zero degrees, which corresponds to normal incidence onto the filter surface. The blue-shift vs. AOI (see FIG. 8a) can be quantitatively characterized as $$\lambda = \lambda_0 \sqrt{1 - \left(\frac{\sin\theta}{n_{eff}}\right)^2}, \quad (6)$$

where $\theta$ is the AOI, $\lambda$ is the transmitted wavelength for AOI=$\theta$, $\lambda_0$ is the transmitted wavelength for AOI=0°, $n_{eff}$ is the MLD stack effective refractive index (approximately given by the average indices of the stack material layers), and the refractive index of the medium surrounding the filter has been taken to be ~1 (e.g. air). A direct consequence of Eq. (6) is that, in order for the filter to remain functional and continue to transmit its intended wavelength, $\lambda_0$, even at AOI=$\theta\neq$0°, the filter transmit spectral window must be wide enough to still encompass $\lambda_0$ as the transmit window blue-shifts for shallower AOI. This condition is illustrated in FIG. 8b and expressed as $$FOV \sim 2\arcsin\sqrt{n_{eff}^2 \frac{\delta\lambda}{\lambda_0}}. \quad (7)$$

Here, $\delta\lambda$ is the full width of the filter spectral transmission window and FOV denotes the filter field of view, which corresponds to the twice the value of AOI, for which the wavelength shift equates the filter window half-width $\delta\lambda/2$. The filter FOV practically determines the maximum value of AOI for which the filter still functions as intended by continuing to transmit the designated signal wavelength.

Figure 9:
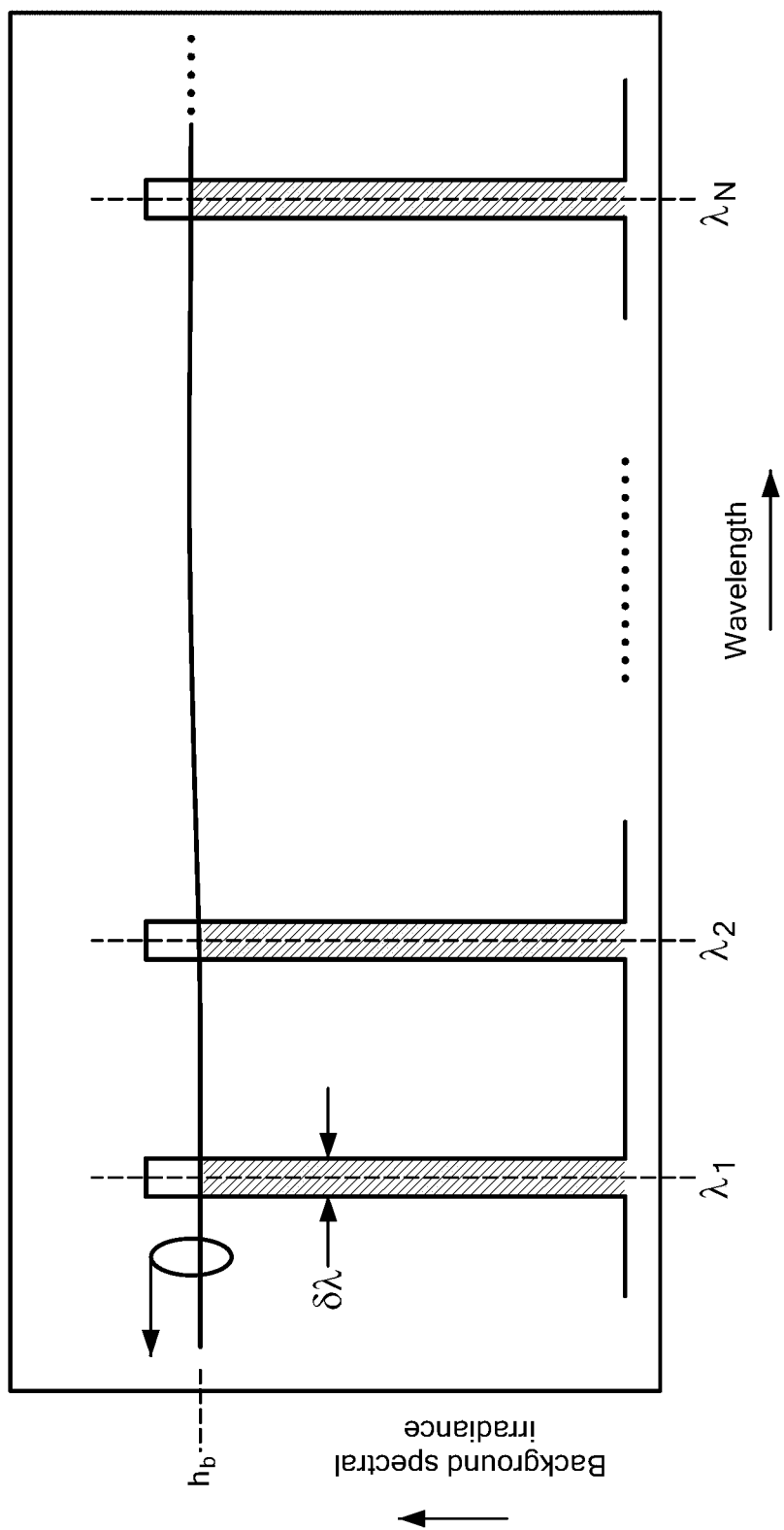
FIG. 9 is a representation of an example bandpass filter having a plurality of transmitting windows.

In the case of a multi-wavelength optical signal such as the laser beam transmitted by a SBC-based transceiver, the appropriate bandpass filter would feature a plurality of transmitting windows, as schematically illustrated in FIG. 9. Schematic transmission spectrum of a transmissive multi-wavelength, comb-like optical band-pass filter is shown. Each comb line (tooth) is centered at a wavelength $\lambda_i$, which corresponds to one of the wavelengths being generated in a spectrally combined transceiver. The background spectral irradiance level, $h_b$, is also shown. Each comb-line pass band represents a spectral "aperture" through which background illumination can reach the sensor, contributing to noise.

Each transmitting window is centered at one of the laser wavelengths used in the SBC architecture. Optical band-pass filters of this type are sometime referred to as "comb filters" and are characterized by the central wavelength and spectral width of each comb tooth. Comb filters implemented in a SBC-based transceiver can significantly reduce the transceiver operation SNR. In example embodiments of LiDAR, remote sensing and lasercom, background illumination constant in time such as solar stray light provides a significant contribution to shot noise in the signal detection. If the electronics-related shot noise is minimized, the SNR can be dominated by this light-driven shot-noise source and, accordingly, the SNR can be expressed as $$SNR \propto \left(1 + \frac{I_b}{I_{laser}}\right)^{-1/2}. \quad (8)$$

Here, $I_{laser}$ and $I_b$ are the irradiance of the received signal and noise-inducing background light arriving at the sensor location, respectively. As illustrated in FIG. 1, in the case of a single-wavelength transceiver implementing a bandpass filter of full-width $\delta\lambda$, the noise irradiance, $I_b$, is given by $$I_b \sim h_b \delta\lambda, \quad (9)$$

where $h_b$ is the spectral irradiance of background light. For example, in applications where most background light consists of solar illumination reflected off the target and the laser transmitter wavelength (hence, center of the band-pass filter transmitting window) is ~1.5 µm, then $h_b$~0.2 W m$^{-2}$ nm$^{-1}$. If N laser sources are spectrally combined and a comb bandpass filter is used in which each of the corresponding N comb teeth exhibits the same full-width $\delta\lambda$, the value of $I_b$ scales up as $$I_b \sim N h_b \delta\lambda, \quad (10)$$

where the background illumination spectral irradiance has been taken as approximately constant over the spectral range determined by the wavelengths of the N laser sources combined. Such an increase in SNR could hinder the operation of shot-noise-limited sensors. To offset the SNR degradation completely, the spectral width of each comb tooth should then be accordingly reduced to δλ'=δλ/N. This requirement might be difficult to meet, due to limitations in MLD bandpass-filter design and fabrication technology especially if, as would often be the case in many embodiments, δλ~1 nm and N>10. Moreover, according to Eq. (2), the narrower pass bands would inevitably result in an unwanted reduction of the filter FOV, and, consequently, of the overall receiver FoV.

It may be beneficial for example applications including transceivers based on and leveraging the benefits of SBC to implement a receiver exhibiting an as-wide-as-possible FoV or at least FoV limited only by the intended design of the collection/imaging optics, not by the pass bandwidth of the optical band-pass filters used. To this end, several band-pass filtering methods that relieve or lift FoV limitations are described below for enabling components for SBC-based LiDAR, remote sensing, and lasercom transceivers.

Figure 10:
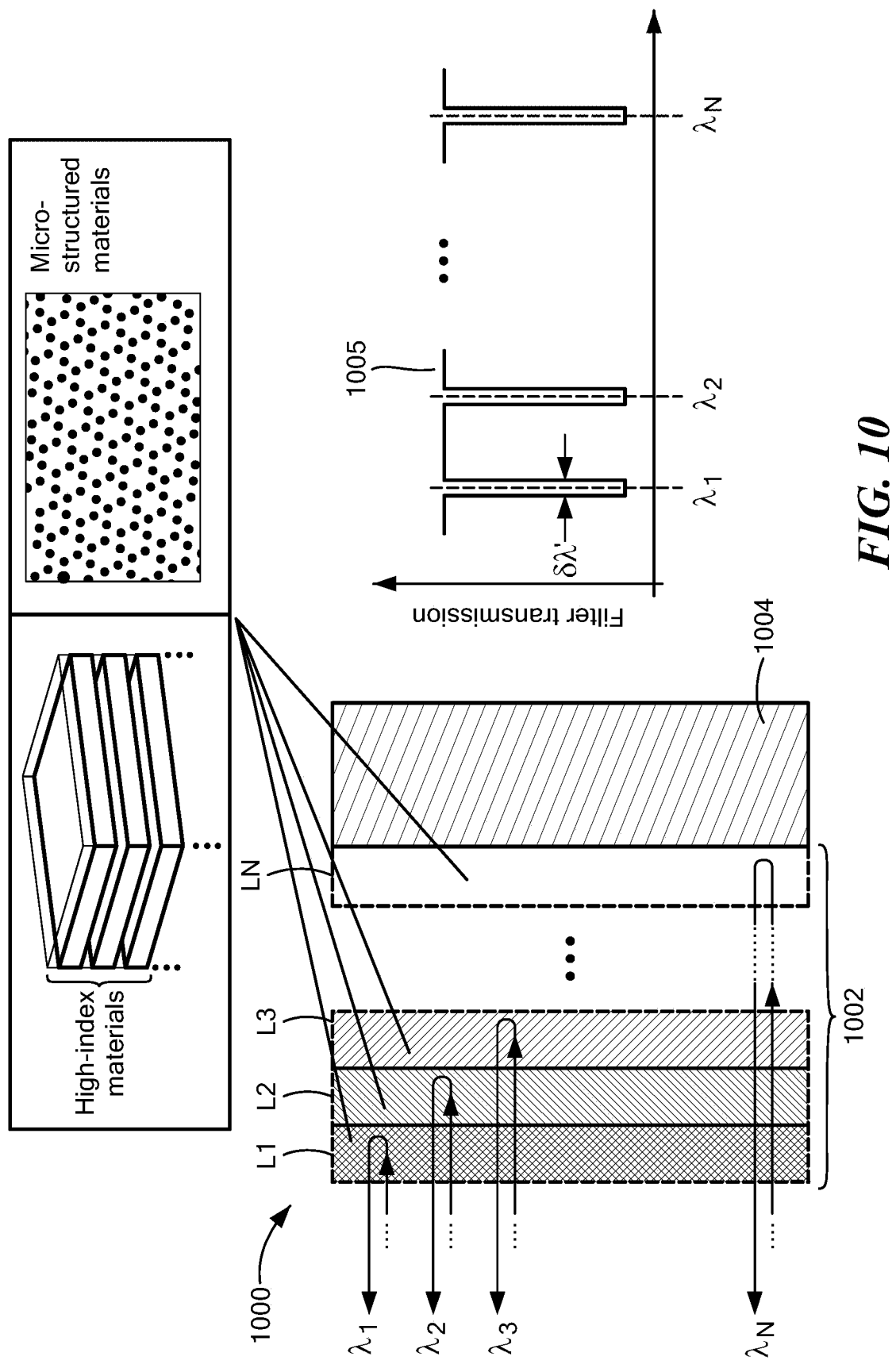
FIG. 10 is a schematic representation of an example transceiver filter embodiment.

FIG. 10 illustrates an example reflective, multi-wavelength band-pass filter ("multi-notch" filter) featuring several reflective band-pass layers each designed to reflect a narrow window around each of the wavelengths used in a spectrally combined transceiver, deposited onto a transmissive substrate which lets most background radiation through. Several technologies can be used to reduce the AOI-sensitivity of the filter reflective layers including high index materials and engineered materials such as photonic crystals.

In one embodiment, the filter 1000 is structured as a stack 1002 of a N coating layers L1-N applied onto a transmissive optical substrate 1004 (e.g. fused silica). In an embodiment, each of the N superimposed coating layers L is itself a MLD stack, similar to that illustrated in FIG. 7. Each of these MLD stacks is designed to operate as a single-wavelength notch filter 1005, i.e. exhibit high reflectivity for a narrow spectral window of width OA' around the wavelength $\lambda_i$ (with i=1, N identifying the laser-transmitter signal wavelengths in the SBC configuration) and high transmissivity everywhere else in the spectrum. The ensemble of all superimposed MLD stacks 1002 thus forms a multi-wavelength notch filter reflecting around all of the combined wavelengths $\lambda_1, \ldots, \lambda_N$ (and narrow spectral windows around them). In one embodiment, each MLD stack L1-N is constructed with higher-refractive-index materials compared to ordinary oxide-type materials widely used in the art. Using higher-index materials, dielectrics or semiconductors, for the band-pass filter coating results in a higher $n_{eff}$ value, hence reduced sensitivity to the light AOI, as shown in FIGS. 8a and 8b. In addition to a high refractive index, candidate coating materials must also exhibit electronic bandgap energy, $E_g$, greater than the maximum photon energy of incoming light:

$$E_g > hc/\lambda_1. \quad \text{(ii)}$$

Here, h is Planck's constant (~6.626×10⁻³⁴ m² kg s⁻¹), c is the speed of light in vacuum, and $\lambda_1$ is the shortest wavelength among those combined in the SBC architecture. When Eq. (11) is satisfied, incoming photons do not exhibit sufficient energy to induce electronic transitions from the material valence to conduction band, which results in negligible optical absorption at the laser transmitter (signal) wavelengths. The bandgap energy and refractive index values in naturally occurring bulk (non-engineered) materials are not mutually independent, but are rather coupled by an inverse trend such that high index correspond to small bandgap energies and vice versa. Therefore, ideal bulk materials for low AOI-sensitivity multi-wavelength filters configured as shown in FIG. 10 exhibit $E_g$ values just above the photon energy corresponding to the designated operation wavelength and, among these, the ones having the highest possible refractive index. For example, materials with $E_g$~1 eV or just below this value are suitable for operation at eye-safe wavelength ~1.55 μm. Indirect-bandgap materials, in which valence- to conduction-band electronic transitions require phonon participation to conserve momentum, also are especially suitable in that they typically exhibit lower photon absorptance compared to direct-bandgap materials, for a given value of $E_g$. Examples of low-$E_g$ and high index materials known in the art are silicon (which is a direct-bandgap material in its crystalline form, while being a direct one in amorphous form) and germanium (indirect-bandgap material). Several transition-metal chalcogenides as well as main-group-element chalcogenides (such as tungsten di-sulfide and antimony tri-selenide) are also suitable optical coating materials of this type. The impact of higher index materials, hence higher $n_{eff}$ in a MLD filter is captured in FIGS. 8a and 8b, which compares the dispersive and FoV limiting behavior of a very commonly used MLD stack (namely fused-silica and tantala, corresponding to $n_{eff}$~1.75 at 1550 nm) and one based on amorphous silicon and tungsten disulfide ($n_{eff}$~3.6 at 1550 nm).

In other embodiments, specialty materials such as topological insulators (TIs) can be used in the fabrication of multi-wavelength filters. TIs exhibits quantum states typical of insulators, including an electronic bandgap, in their bulk, but also exotic metallic bandgap-less edge states confined at their surface and stably separated from the bulk by topological properties of the quantum wave function. Among other unique properties, certain types of thin-film TI including non-stoichiometric BSTS compounds (bismuth-antimony telluride selenide such as $Bi_{1.5}Sb_{0.5}Te_{1.8}Se^{1.2}$) may exhibit very high bulk refractive index, relatively low surface index, and high near-infrared transparency. In some embodiments, a single thin-film BSTS layer can thus form a Fabry-Perot cavity having effective reflective index, $n_{eff}$ in excess of 6 and good near-IR transmissivity. In some embodiments, multiple BSTS or other TIs of similar optical properties can be sandwiched between thin layers of ordinary dielectrics, such as silicon, to form multi-wavelength multi-layer reflective structures similar to that shown in FIG. 10, having very high $n_{eff}$ values not attainable in naturally occurring bulk insulators transparent in the near-IR.

While the above description centers around a notch filter design having superimposed regions each reflecting a distinct wavelength, other embodiments are possible using the optical materials described above. In some of these embodiments, for example, the superimposed regions are transmissive at the wavelengths of interest and the filter behave as a transmissive comb filter as that illustrated in FIG. 9.

In other embodiments, the multi-wavelength band-pass filter comprises one or more layers of engineered materials operating as photonic crystals (PCs). PCs are periodic optical nanostructures consisting of a spatially alternating lattice of high-refractive-index-contrast regions, the lattice scale typically being a fraction of the optical wavelength. Through proper design of the PC lattice geometry, the PC can be made to exhibit complete photonic bandgaps for certain spectral intervals. Photons having energy within a bandgap cannot propagate through the crystal regardless of their AOI, which means that PC can act as a spectrally selective, omnidirectional reflector. This behavior is markedly different from standard optical materials, which are instead governed by the dispersive equations (1) and (2). In some embodiments, the PC can be designed as a two-dimensional (2D) lattice of features such as nano-rods or holes etched within a homogeneous material substrate (see FIG. 10) by means of techniques such as e-beam lithography with inductively-coupled plasma/reactive-ion etching. In some embodiments aimed at operation wavelengths ~1.5 μm or longer, the substrate material can for example be silicon and the 2D lattice can exhibit symmetric patterns such as triangular, Kagome, square, and Lieb as well other geometric variants of these patterns. In other embodiments, a one-dimensional lattice such as for example a resonance-waveguide grating can be adopted. In general, geometric aspects of the PC lattice such as the lattice feature dimension and period (lattice pitch or constant) determine the large-scale optical properties of the PC and can be designed by means of modeling tools including finite-difference time-domain simulation. Multi-wavelength filters can thus be obtained by engineering PCs that have isolated, spectrally narrow, complete photonic bandgaps or a stackable PCs each having one photonic bandgap of this type.

Figure 11:
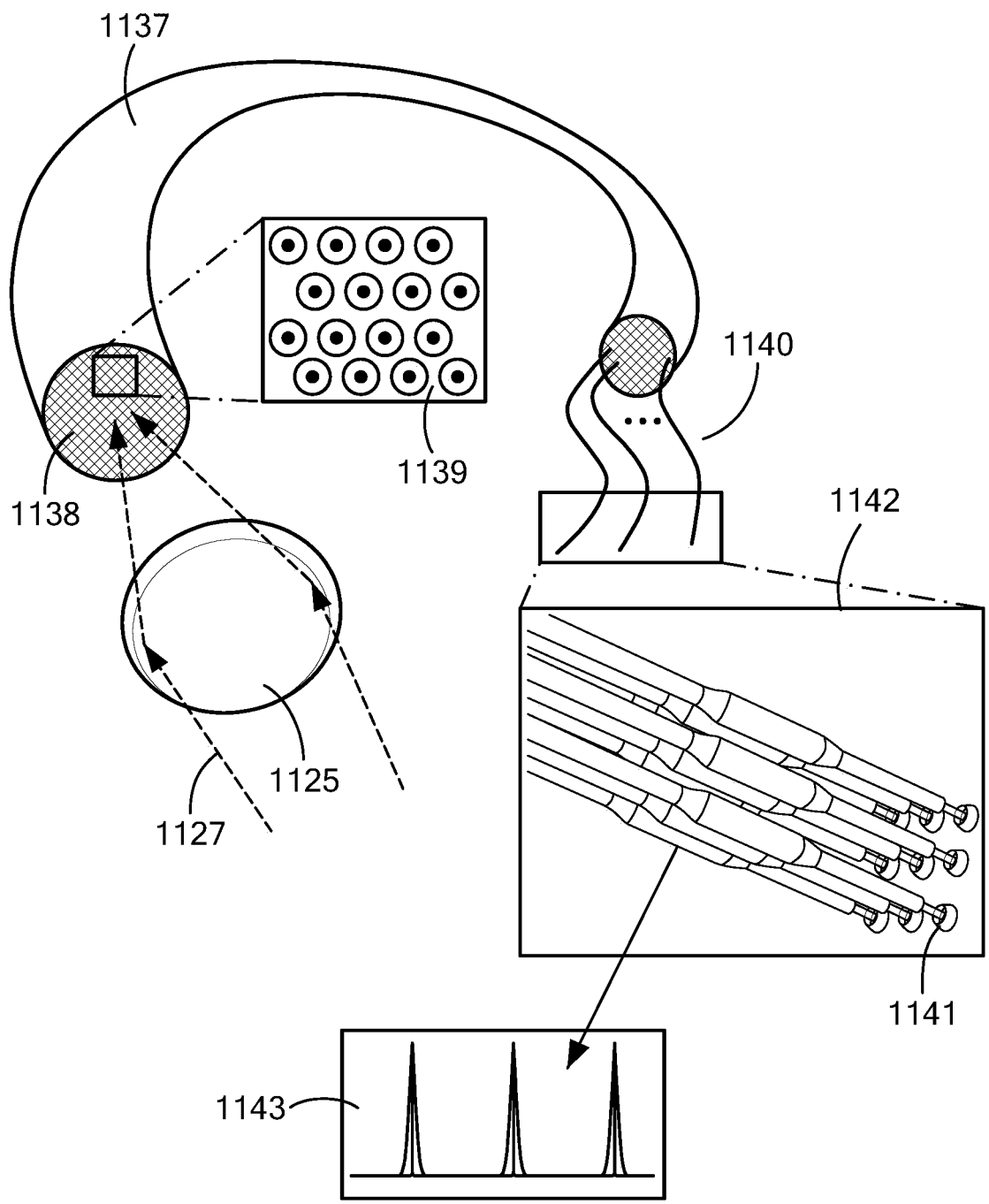
FIG. 11 is a schematic representation of an example SBC-based transceiver having an FWHM-based filter.

A significantly different embodiment of receiver architecture capable of effectively processing the multi-wavelength beam received as the signal in the case of a SBC-based transceiver is illustrated in FIG. 11.

A multi-wavelength fiber-coupled receiver includes a multi-mode (MM) fiber bundle 1137 and a MM fiber-bundle input surface 1138, along with a fiber-optic plate (with MM fiber ends arranged in a hexagonal pattern) 1139. A distal end 1140 of bundled MM fibers has a signal light 1141 exiting each of the bundled fibers to a photo-detector 1142 coupled to a fiber-coupled comb filter 1143.

In this embodiment, the narrow-linewidth multi-wavelength, comb-type free-space bandpass filter described above is removed or replaced by an ordinary (single-window) reflective or transmissive, broader band-pass filter having FWHM in excess of $\Delta\lambda = \lambda_N - \lambda_1$. Such a filter does not discriminate individual wavelengths in the SBC transceiver, but simply provides preliminary coarse spectral discrimination of all the SBC wavelengths as a whole from background illumination and, as such, does not limit the receiver FoV. Fine separation of individual signal wavelengths from inter-wavelength background is, instead obtained as follows. The FPA sensor or sensor array shown in FIG. 5 is replaced by the facet of an optical fiber bundle, namely an ensemble of optical fibers, each having one of their ends installed on a common holding structure, often referred to as "fiber-optic plate". In typical embodiments, the bundled fiber ends are arrayed in a geometrically symmetric fashion to form, for example, a rectangular or hexagonal pattern. They are also mounted such that each facet is flush with the exit surface of the fiber-optic plate, so as to define a common smooth surface, which, in some embodiments, may correspond with the image plane of the receiver lens system. In some embodiments, passive (i.e. not rare-earth-doped) multi-mode (MM) fibers are used in the bundle, each having core diameter ~50 μm or greater and core numerical aperture NA~0.1 or greater. The received signal beam is then focused to form an image at the fiber-optic plate location and therefrom coupled into the bundled MM fiber ends that lie spatially within that image. In typical embodiments, the guiding core and cladding diameters in the bundled MM fibers are determined based on geometric optics considerations so as to ensure adequate surface fill factor, hence high-efficiency coupling of the received optical signal beam into fibers, as well as minimal inter-fiber spatial cross-talk. The latter condition ensures that light coupled into one fiber (or uncoupled light falling between fibers) does not spill into adjacent fibers hindering the image integrity. In this way, each bundled fiber facet in the fiber-optic plate can be regarded as notionally equivalent to a pixel of the FPA array of FIG. 5. In typical embodiments, the fiber bundle is constructed in such a way that all bundled fibers have the same length and never cross or twist along their length so that each fiber facet at the distal end of bundle exactly matches its location of the input end at the fiber-optic plate and thus the image collected at the fiber optic-plate is effectively transported without any spatial or temporal scrambling at the fiber bundle exit end. In turn, each bundled fiber end can be coupled to an individual photonic sensor, such as a SPAD in some embodiments, which enables the LiDAR or remote sensing signal detection, as well as imaging LiDAR operation. Prior to being coupled into the sensor element, however, the signal light guided into each of the bundled fibers is transmitted through a fiber-coupled comb filter, which is fusion-spliced to each bundled fiber. In some embodiments, such MM-fiber-coupled comb filters can be constructed using a series of high-transmission and low insertion-loss fiber-Bragg grating filters, one per each wavelength combined in the SBC architecture. In other embodiments, MM-fiber-coupled Fabry-Perot etalon filters can be used for the same purpose or other types of multi-line fiber-optic filter constructs. A property common to all such fiber-coupled filter embodiments is that they are immune to the dispersive and FoV-limiting behavior of their free-space counterparts because the light impinging on the fiber-coupled filter is waveguided within the fiber core, hence its AOI is always effectively normal regardless of the free-space AOI with which the light initially entered the receiver optical path. As a result, the filter spectral width is effectively decoupled from received light AOI and very narrow-bandwidth filters can be used, which accordingly yield strong background rejection and high SNR, without any impact on the receiver FoV. Among advantages of this fiber-coupled receiver architecture is the fact that an ensemble of individual photodetectors such as SPADs or other light-sensing devices can be used and their mutual distance, fill factor or spatial location is irrelevant in that such sensors are only used to detect light, not reconstruct an image. In other words, a close-packed sensor array such as a SPAD camera is not required, which may realize significant cost savings and considerable simplification of the signal readout electronics especially when large-pixel-number cameras are needed. Moreover, technical limitations dictating the maximum number of pixels in such cameras become irrelevant, as fiber bundles can in principle be constructed with an arbitrary number of fibers and the number of bundled fibers is thus bound only by packaging-size constraints for the receiver.

Figure 12:
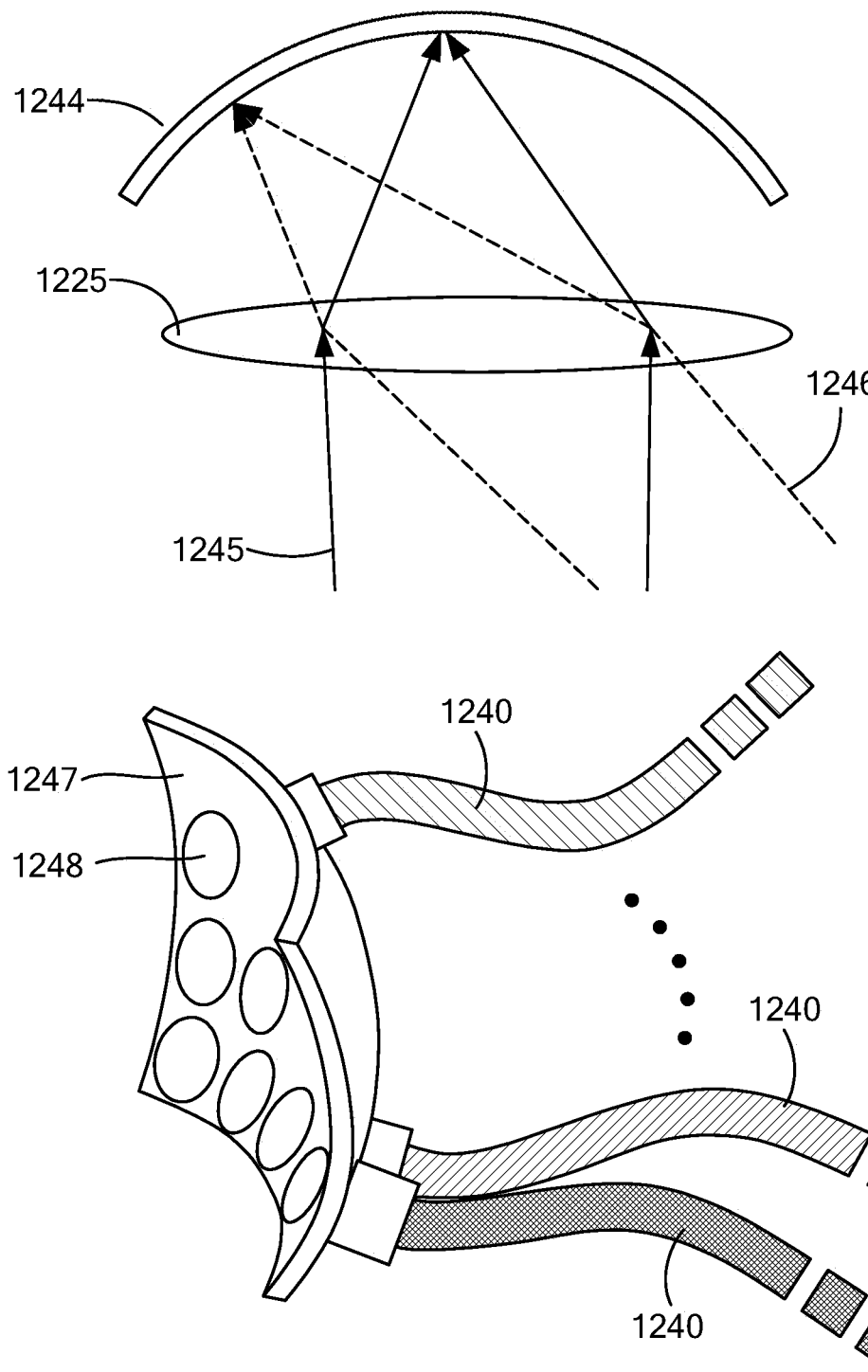
FIG. 12 is a schematic representation of a fiber-coupled receiver having a curved surface at the receiver image location.

As illustrated in FIG. 12, another advantage of the fiber-coupled receiver is that the fiber-optic plate at the receiver image location does not need to be flat/planar, but can just as easily be constructed in such a way that the bundled fiber facets are arrayed on a curved surface, the difference being only in the geometric shape of the fixture (which can be a precision-machined metallic or plastic part as well as a molded glass component etc.) holding the fiber facets in place. Having a curved focal surface is well known in the art as a generally effective approach to improving imaging systems through the reduction of aberrations (e.g. occurring for large-angle input rays and/or non-flat objects) by conforming the focal surface to the natural curvature of the imaging-lens focal surface, referred to in some embodiments as Petzval surface. An exemplary embodiment of a curved-focal imaging system well known in the art is the Schmidt telescope. While the benefits of curved focal surfaces are clear, they are normally viewed as a complicated feature to include in imaging systems because it is, in practice, very difficult from an opto-electronic design standpoint to curve the sensing region of imaging detectors such as high-pixel-density photo-diode array cameras. This problem is, in essence, eliminated in a fiber-coupled receiver.

FIG. 12 shows an example schematic diagram of curved-focal-surface fiber-coupled receiver having a curved focal surface 1244 for a central ray for received beam 1245 and a shallow angle ray for received beam 1246. A curved fiber-optic plate 1247 is coupled to individual bundled-fiber 1240 input facets 1248 installed on curved fiber-optic plate 1247.

Figure 13:
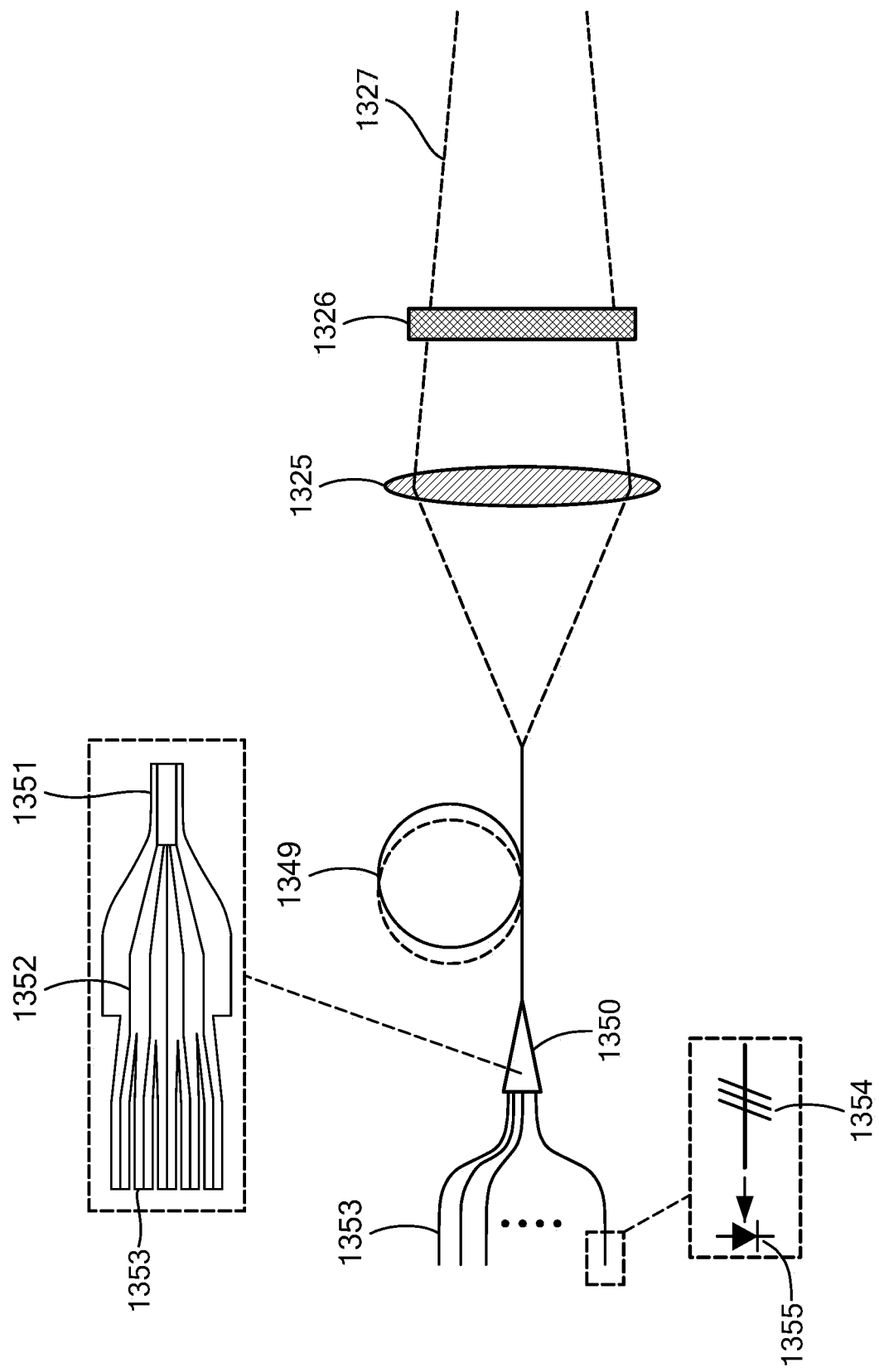
FIG. 13 is a schematic representation of a fiber-coupled receiver in a multi-wavelength SBC-based transceiver.

FIG. 13 illustrates an embodiment for a fiber-coupled optical receiver in a multi-wavelength, SBC-based transceiver used for lasercom applications. An exemplary architecture of fiber-coupled receiver in a spectrally beam-combined lasercom transceiver performing wavelength-division multiplexing includes a single, receiving multi-mode (MM) fiber 1349 and a photonic lantern (PL) 1350. A MM fiber end 1351 of the PL extends from a PL tapered transition region 1352 of PL single-mode output fiber pigtails 1353. A multi-wavelength filter (de-multiplexer) 1354 is located near photodetector(s) 1355. The receiver can include a focusing (imaging) lens or lens system 1325 and band-pass filter 1326 for received optical beam 1327 from LiDAR target or remote lasercom station, as described above.

In typical embodiments of this application, mere photon collection, not imaging capabilities, is required and therefore the receiving fiber bundle described above can be replaced by a single MM fiber of adequate core diameter and NA. In some embodiment, this MM fiber can be the terminal of a fiber-optic construct referred to as "photonic lantern", which the light guided in a MM fiber is split and coupled into a number of single-mode fibers, the transition from MM fiber to ensemble of single-mode fibers being spatially adiabatic so as to ensure minimal optical loss. In some embodiments, each of single-mode fiber can be fusion-spliced to a standard telecom-type wavelength division de-multiplexer, which separates the wavelength components (channel) of the received multi-wavelength signal to permit decoding of the data-streams encoded in each channel. In other embodiments, a coarse MM wavelength-division de-multiplexer can be directly fusion-spliced to the receiving MM fiber.

Various features of spectral beam combining are shown in described in U.S. Pat. Nos. 8,472,763, 9,207,408, 8,903,209, 8,107,167, 7,199,924, and 8,441,718, all of which are incorporated herein by reference.

Figure 14:
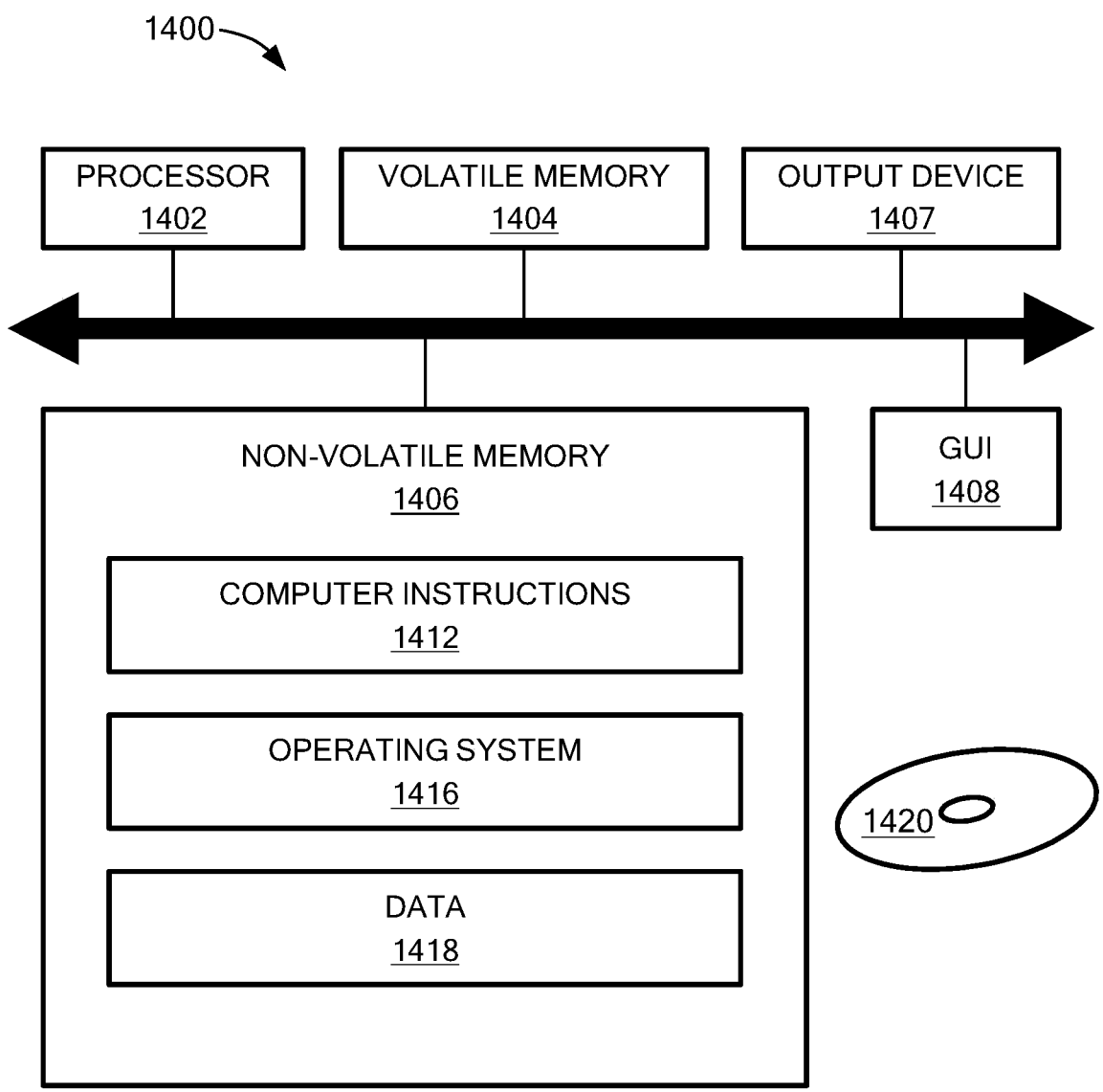
FIG. 14 is a schematic representation of an example computer that can perform at least a portion of the processing described herein.

FIG. 14 shows an exemplary computer 1400 that can perform at least part of the processing described herein. The computer 1400 includes a processor 1402, a volatile memory 1404, a non-volatile memory 1406 (e.g., hard disk or Flash memory), an output device 1407 and a graphical user interface (GUI) 1408 (e.g., a mouse, a keyboard, a display, for example). The non-volatile memory 1406 stores computer instructions 1412, an operating system 1416 and data 1418. In one example, the computer instructions 1412 are executed by the processor 1402 out of volatile memory 1404. In one embodiment, an article 1420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A transmitter, comprising:
  a plurality of pulsed lasers having respective output beam;
  a launch array configured to spatially position each output beam of the pulsed lasers, wherein the launch array comprises a mechanical structure;
  a transform optical component to correct deflection of the output beams of the pulsed lasers from the launch array; and
  an omnidirectional spectral comb filter to combine the output beams from the transform optical element and generate a spectrally combined beam.

2. The transmitter according to claim 1, wherein the omnidirectional spectral comb filter comprises a diffraction grating.

3. The transmitter according to claim 1, wherein the transform optical component comprises a lens.

4. The transmitter according to claim 1, wherein the pulsed lasers comprise pulsed fiber lasers (PFLs).

5. The transmitter according to claim 1, wherein each of the pulsed lasers is configured to output a distinct pulse sequence for wavelength-division multiplexing.

6. The transmitter according to claim 5, wherein each of the pulsed laser output beams are spatially overlapped to propagate as the spectrally combined beam, and wherein each wavelength of the pulsed laser output beams carries a different data stream.

7. The transmitter according to claim 1, wherein the pulsed laser comprises a pulsed fiber laser having:
   a master oscillator;
   a light amplitude modulator; and
   an optical phase modulator.

8. The transmitter according to claim 7, wherein the master oscillator comprises a single-frequency laser source.

9. The transmitter according to claim 7, wherein the light amplitude modulator comprises a Mach-Zehnder interferometer.

10. The transmitter according to claim 7, wherein the optical phase modulator is configured to encode data streams.

11. The transmitter according to claim 7, wherein the pulsed fiber laser further comprises:
   a fiber-based pre-amplifier coupled to the optical phase modulator; and
   a fiber-based power amplifier; and
   a filter between the pre-amplifier and the power amplifier, wherein the power amplifier provides a respective one of the output beams of the pulsed lasers.

12. The transmitter according to claim 11, wherein the fiber-based pre-amplifier comprises a fiber-coupled diode laser.

13. The transmitter according to claim 11, wherein the power amplifier is configured to output a Gaussian output signal.

14. A receiver to detect light from a spectrally combined beam (SBC) transmitter, comprising:
   an optical element to focus the detected light;
   an omnidirectional spectral comb filter to filter the focused light from the optical element, wherein the omnidirectional spectral comb filter includes a plurality of windows each having a respective pass band; and
   a photon detector to process received data from the optical element and discriminate the light from the SBC transmitter from spectrally broadband illumination.

15. The receiver according to claim 14, wherein the omnidirectional spectral comb filter is insensitive to angle of incidence.

16. The receiver according to claim 14, wherein the photon detector comprises a photomultiplier.

17. The receiver according to claim 14, wherein the photon detector comprises a focal plane array (FPA).

18. The receiver according to claim 14, wherein the omnidirectional spectral comb filter comprises an optically transmissive substrate surface coated with a multi-layer dielectric coating.

19. The receiver according to claim 14, wherein the spectrally broadband illumination includes solar stray light.

\* \* \* \* \*